(12) United States Patent
Narumi et al.

(10) Patent No.: US 7,176,677 B2
(45) Date of Patent: Feb. 13, 2007

(54) STATIONARY POSITION DETECTION CIRCUIT AND MOTOR DRIVE CIRCUIT

(75) Inventors: Satoshi Narumi, Itami (JP); Masaharu Hoashi, Itami (JP); Toshiya Suzuki, Itami (JP); Daisuke Suetsugu, Itami (JP); Hikaru Nakamura, Itami (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/476,052

(22) Filed: Jun. 28, 2006

(65) Prior Publication Data

US 2007/0001669 A1     Jan. 4, 2007

(30) Foreign Application Priority Data

Jun. 29, 2005 (JP) .............................. 2005-189391

(51) Int. Cl.
 G01B 7/30  (2006.01)
 G05D 3/00  (2006.01)
(52) U.S. Cl. .................. 324/207.25; 318/652; 318/653
(58) Field of Classification Search ........... 324/207.25; 318/652, 653
See application file for complete search history.

(56) References Cited

FOREIGN PATENT DOCUMENTS

| JP | 2002-315385 | 10/2002 |
|---|---|---|
| JP | 2002-335691 | 11/2002 |
| JP | 2002-345286 | 11/2002 |
| JP | 2003-47280 | 2/2003 |

Primary Examiner—Bot LeDynh
(74) Attorney, Agent, or Firm—Buchanan Ingersoll & Rooney PC

(57) ABSTRACT

A stationary position detection circuit and a motor drive circuit capable of more properly detecting the rotor position are disclosed. The stationary position detection circuit supplies an alternating current to each phase load of the motor. The time during which the current flows in a first direction and the time during which the current flows in a second direction opposite to the first direction are converted into electrical signals and amplified. In accordance with the value of the electrical signals, the position of the motor rotor in stationary mode is determined. The use of the alternating current, unlike the kickback voltage, makes it possible to improve the detection accuracy by amplifying the electrical signals with an increased number of alternations. An increased number of alternations can amplify the electrical signals without increasing the value of the alternating current, and therefore, unlike in the case of the kickback voltage, the alternating current of a large value is not required. As a result, the alternating current can be reduced to a small value and the vibration can be suppressed.

7 Claims, 10 Drawing Sheets

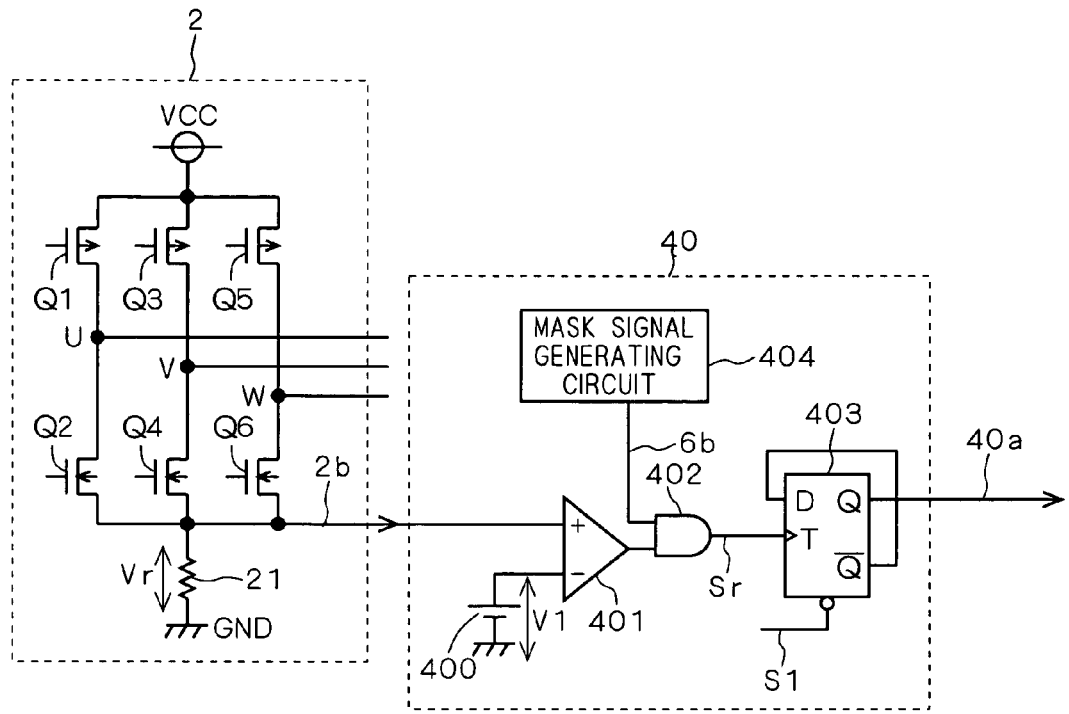
F I G . 4
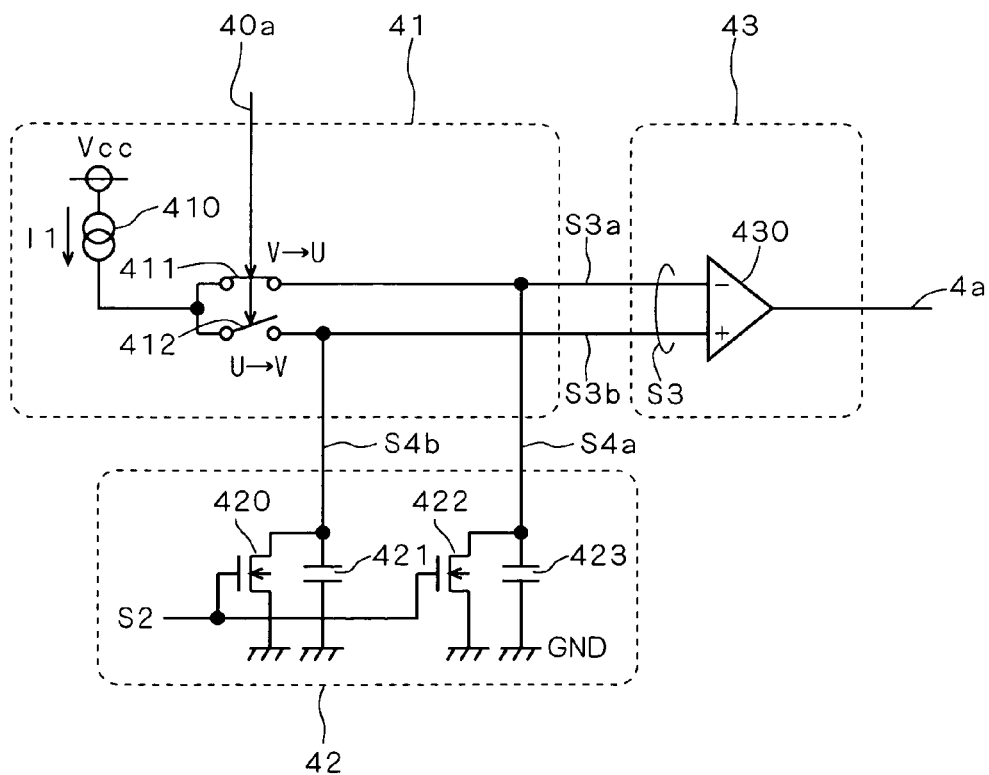
F I G . 5

CURRENT AMOUNT INCREASED

CURRENT AMOUNT DECREASED

FIG. 15
| ROTOR POSITION | RELATIVE POSITIONS OF STATOR AND ROTOR | DETERMINATION SIGNAL |
|---|---|---|
| ① | 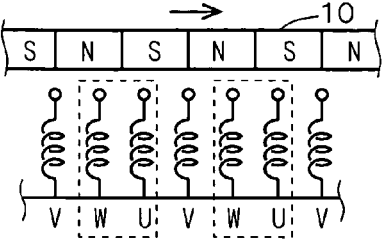 | U→V : L<br>V→W : L<br>W→U : H |
| ② | 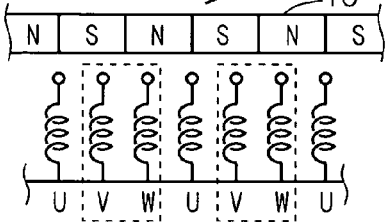 | U→V : H<br>V→W : L<br>W→U : H |
| ③ | 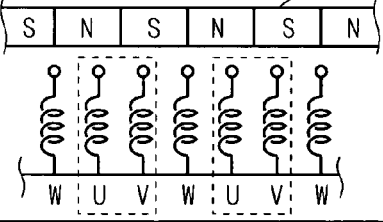 | U→V : H<br>V→W : L<br>W→U : L |
| ④ | 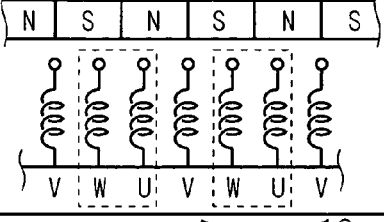 | U→V : H<br>V→W : H<br>W→U : L |
| ⑤ | 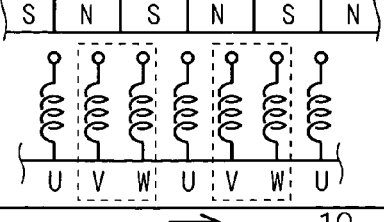 | U→V : L<br>V→W : H<br>W→U : L |
| ⑥ | 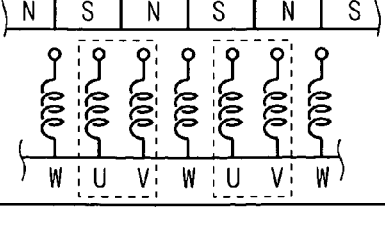 | U→V : L<br>V→W : H<br>W→U : H |

F I G . 1 6
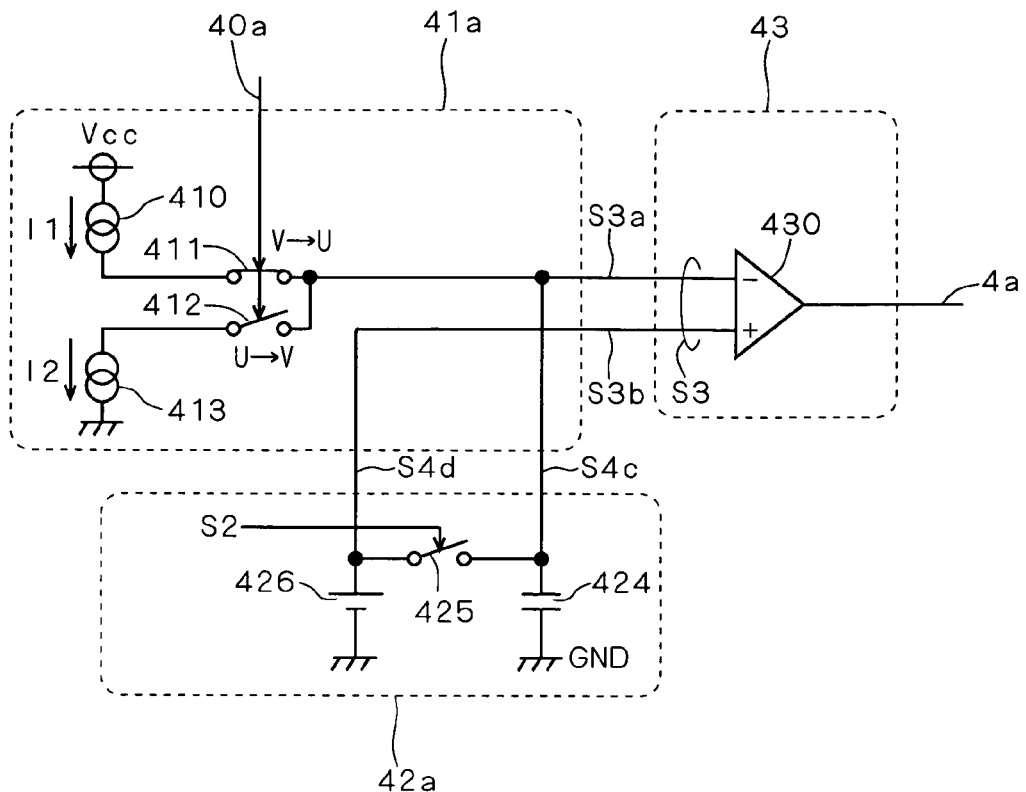
F I G . 1 7
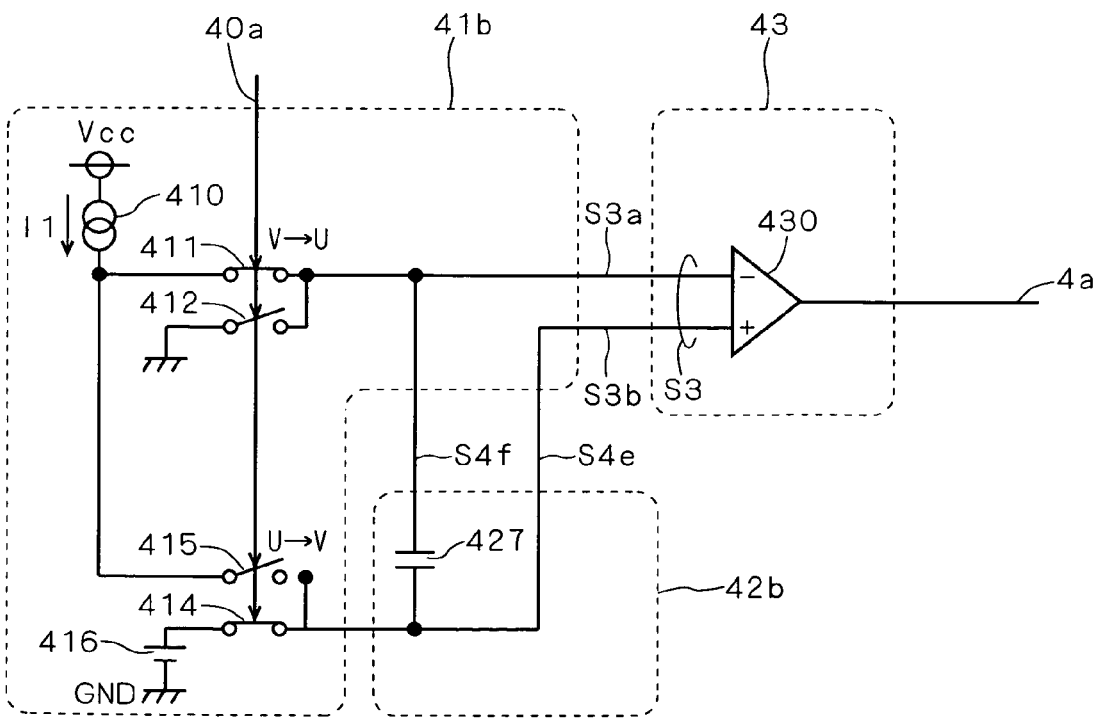

STATIONARY POSITION DETECTION CIRCUIT AND MOTOR DRIVE CIRCUIT

BACKGROUND OF THE INVENTION

1. Field of the Invention

The present invention relates to a stationary position detection circuit and a Hall sensorless motor drive circuit capable of detecting the position of a motor rotor.

2. Description of the Background Art

In driving a motor having a rotor such as a small three-phase DC brushless motor, the motor drive circuit is required to be kicked at the time of starting. In the process, unless the rotor position can be detected properly, the proper starting is impossible.

The rotor position can be detected by arranging a Hall sensor configured of a Hall element in the neighborhood of the motor rotor. The use of the Hall sensor, however, leads to an increased cost and a bulkiness. Currently, therefore, vigorous efforts are made to develop what is called a Hall sensorless motor using no Hall sensor.

In the Hall sensorless motor, no induction voltage (counter electromotive voltage) is generated as long as the motor is stationary, so that the position of the rotor cannot be detected. As described in Japanese Patent Application Laid-Open Nos. 2002-345286, 2002-335691 and 2002-315385, therefore, a method has been developed in which the length of the kickback time for turn-off operation is detected by a stationary position detection circuit thereby to detect the position of the rotor of a motor in stationary mode.

Japanese Patent Application Laid-Open No. 2003-47280 is also available as another patent document related to the present patent application.

In the case where the kickback voltage at the time of turning off is measured as in the stationary position detection circuit described in Japanese Patent Application Laid-Open Nos. 2002-345286, 2002-335691 and 2002-315385, the difference in the kickback voltage value with a minuscule inductance difference depending on the rotor position while the motor is stationary makes it possible to detect the rotor position of a stationary motor by detecting the length of the kickback time.

In the detection method using the kickback voltage, however, a large kickback voltage is required to be generated by supplying a large kickback current (for example, about 1 A) to detect the minuscule inductance difference due to the difference of rotor position. This is by reason of the fact that a large kickback voltage is required to sufficiently recognize the difference in the length of the kickback time. The large kickback current is a cause of vibrations.

Also, in the detection method using the kickback voltage, the information indicating the inductance difference can be obtained only for the very short period during which the kickback occurs, and therefore the information may not be sufficiently detected.

SUMMARY OF THE INVENTION

An object of the present invention is to provide a stationary position detection circuit and a motor drive circuit capable of detecting the rotor position more properly.

According to a first aspect of the present invention, a stationary position detection circuit for a motor including a rotor and at least one-phase load detects the position of the rotor in stationary mode, and includes a current amount detector, a time counter, a time difference amplifier and a position determinator.

The current amount detector operates in such a manner that an alternating current flowing alternately in a first direction and a second direction opposite to the first direction is rendered to flow through the load by a control circuit for controlling an inverter circuit for driving the motor, the fact that the alternating current flowing in the first direction has reached a value $\alpha$ is detected, after which the alternating current is rendered to flow in the second direction by gradually decreasing amount of the alternating current through the control circuit, and the fact that the alternating current flowing in the second direction has reached a value $\beta$ equal to and opposite in sign to the value $\alpha$ is detected, after which the alternating current is rendered to flow in the first direction again by gradually decreasing amount of the alternative current through the control circuit, the detection of the values $\alpha$ and $\beta$ and the control of the alternating current by the control circuit being subsequently repeated a predetermined number of times.

The time counter counts the first time for which the alternating current changes from $\alpha$ to $\beta$ and the second time for which the alternating current changes from $\beta$ to $\alpha$.

The time difference amplifier converts the counted first time and second time into electrical signals and amplifies the electrical signals in accordance with the accumulation of the first time and second time by the predetermined number of times, and The position determinator determines the position of the rotor in stationary mode in accordance with the value of the electrical signals.

The time counter counts the first and second time, the time difference amplifier converts the first and second time to electrical signals and amplifies the electrical signals in accordance with a predetermined number of accumulations of the first and second time. The use of the alternating current, unlike the kickback voltage, makes it possible to amplify the electrical signals with an increased number of alternations for a higher detection accuracy. Also, in view of the fact that an increased number of alternations makes it possible to amplify the electrical signals without increasing the alternating current values $\alpha$ and $\beta$, the alternating current of a large value is not required unlike the kickback voltage. As a result, the alternating current can be reduced to a small value (about 0.1 A, for example) and the vibrations can be suppressed. Thus, a stationary position detection circuit capable of detecting the rotor position more properly is realized.

According to a second aspect of the present invention, a motor drive circuit includes the stationary position detection circuit according to the first aspect, the inverter and the control circuit.

In view of the fact that the motor drive circuit includes the stationary position detection circuit according to the first aspect, a motor drive circuit capable of detecting the rotor position more properly is realized.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing a detailed configuration of the current amount detector in the stationary position detection circuit;

FIG. 5 is a diagram showing a detailed configuration of the time counter, the time difference amplifier and the rotor position determinator in the stationary position detection circuit;

FIG. 15 is a diagram for explaining the relation of correspondence between the result of generating the alternating current between the phases and determining the rotor position on the one hand and the rotor position on the other hand;

FIG. 16 is a diagram showing the stationary position detection circuit according to a second embodiment; and FIG. 17 is a diagram showing the stationary position detection circuit according to a third embodiment.

DESCRIPTION OF THE PREFERRED EMBODIMENTS

First Embodiment

According to the first embodiment, there are provided a stationary position detection circuit and a motor drive circuit in which an alternating current is supplied to a motor load and the time during which the current flows in a first direction and the time during which the current flows in a second direction opposite to the first direction are converted into electrical signals, which are amplified to determine the position of the motor rotor in stationary mode according to the value of the electrical signals.

Figure 1:
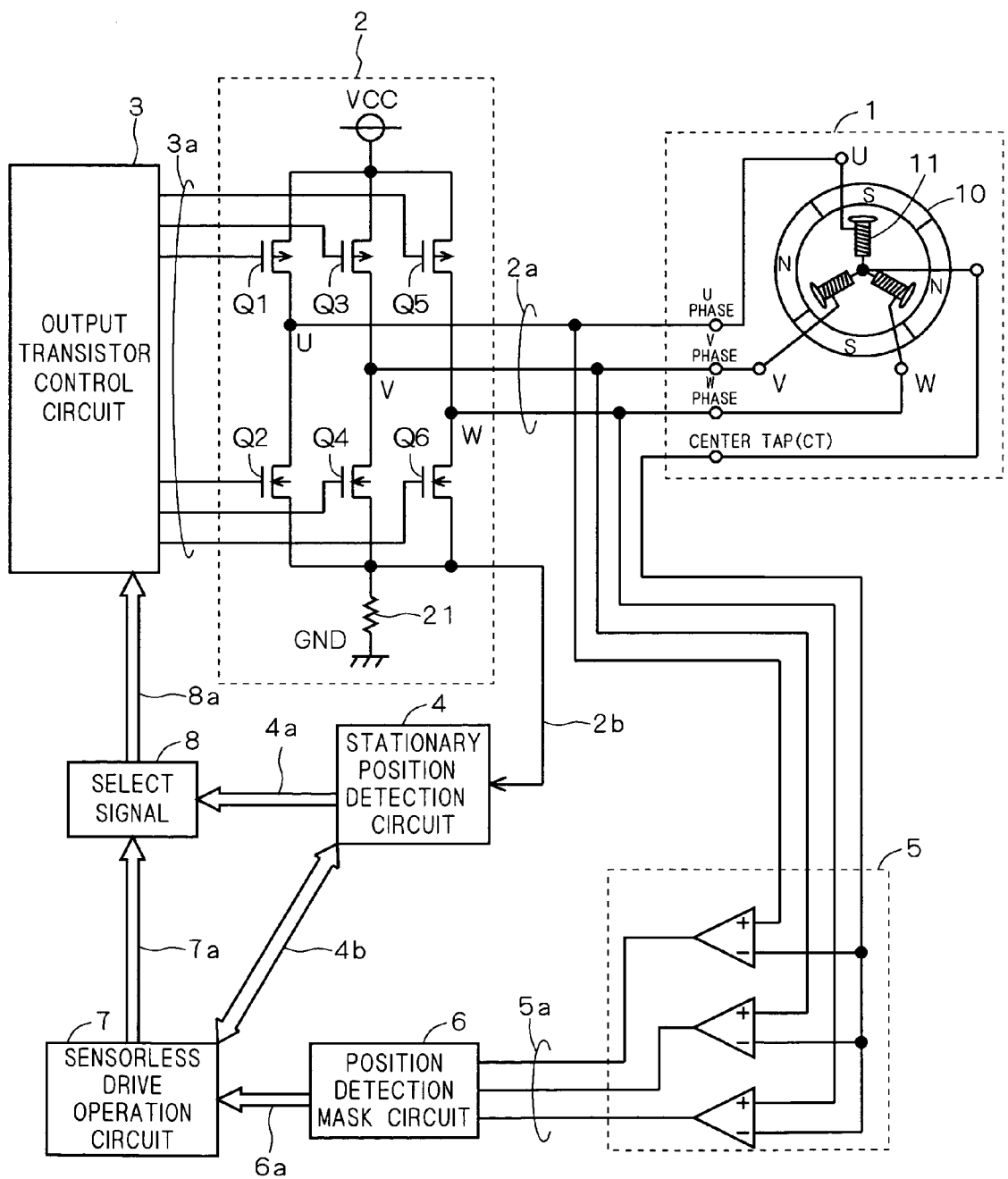
FIG. 1 is a diagram showing a motor drive circuit and a motor according to a first embodiment.

FIG. 1 is a diagram showing a motor drive circuit and a motor according to this embodiment. As shown in FIG. 1, the motor 1 is, for example, a three-phase DC brushless Hall sensorless motor including a rotor 10 of a permanent magnet and a stator 11 configured of a three-phase load with an armature coil wound on a field core. The load of the stator 11 exists for each of the phases U, V, W and coupled to each other at a center tap (CT).

The motor drive circuit, on the other hand, includes an inverter circuit 2 for driving the motor 1 with an output signal 2a thereof, an output transistor control circuit 3 for controlling the inverter circuit 2 with a signal 3a thereof, a stationary position detection circuit 4 for detecting the position of the rotor 10 in stationary mode, a position detection comparator 5 for detecting the position of the rotor 10 in operation, a position detection mask circuit 6 for masking a part of the output signal 5a of the position detection comparator 5, a sensorless drive operation circuit 7 for performing the arithmetic operation for driving in response to the output signal 6a of the position detection mask circuit 6, and a signal select circuit 8 for supplying the output transistor control circuit 3 with, as an output signal 8a, either the output signal 7a of the sensorless drive operation circuit 7 or the output signal 4a of the stationary position detection circuit 4. The stationary position detection circuit 4 works while the motor is stationary, and the sensorless drive operation circuit 7 functions while the motor is rotating. The signal 4b between the two circuits is a shake-hand signal for the operation of the two circuits.

The inverter circuit 2 is a three-phase inverter circuit having transistors Q1 to Q6, in which the transistors Q1, Q2 connected in series make up a first arm, the transistors Q3, Q4 connected in series make up a second arm, and the transistors Q5, Q6 connected in series make up a third arm. The junction between the transistors Q1, Q2 is connected to the U-phase load, the junction between the transistors Q3, Q4 is connected to the V-phase load, and the junction between the transistors Q5, Q6 is connected to the W-phase load. An end of each arm is applied with a power supply voltage VCC, and the other end of each arm supplied with a grounding voltage GND through a resistor 21 for detecting the current amount.

Figure 2:
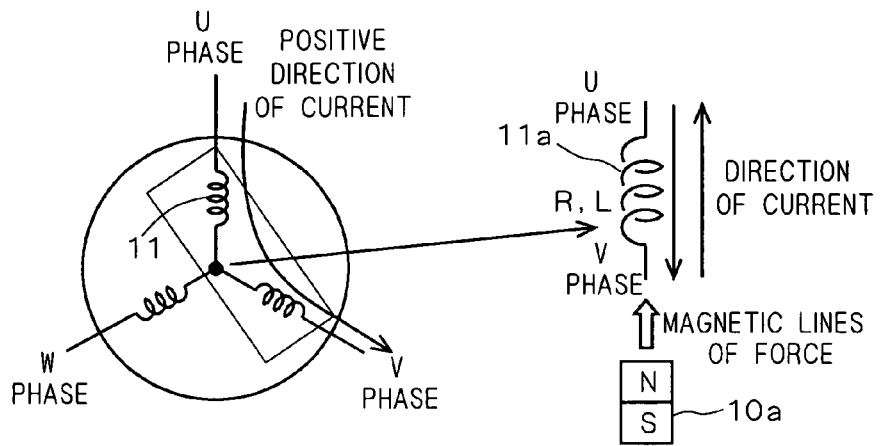
FIG. 2 is a diagram showing the principle of the present invention.

FIG. 2 is a diagram showing the principle of the present invention. In this example, an alternating current is supplied between the U-phase load and the V-phase load of the stator 11. The direction from the U-phase load to the V-phase load is defined as a positive direction and the other direction as a negative direction. Also, the U-phase load and the V-phase load are collectively defined as a load 11a, and the effect that the magnetic lines of force from the rotor 10 have on the load 11a is indicated by a magnet 10a as a simulation.

Currents flow in both positive and negative directions in the load 11a while the motor is rotating. The value of the resistor R of the load 11a remains constant regardless of the physical position of the rotor 10 and the direction of the current flowing in the load 11a. The value of the inductance L of the load 11a, however, varies with the physical position of the rotor 10 and the direction of the current flowing in the load 11a. This is by reason of the fact that the strength of the magnetic lines of force of the magnet 10a and the strength of the magnetic lines of force generated by the current flowing in the load 11a affect the value of the inductance L of the load 11a.

The value of the inductance L of the load 11a changes with the physical position of the rotor 10 in stationary mode and the direction of the current flowing in the load 11a not only while the motor is rotating but also while the rotor 10 is stationary. The magnitude of the value of the inductance L of the load 11a corresponds to the physical position of the rotor 10 and the direction of the current flowing in the load 11a.

Specifically, by defining the aforementioned relation of correspondence in advance, the physical position of the rotor 10 can be determined by detecting the value of the inductance L of the load 11a. This is described in detail later with reference to FIGS. 14, 15. According to the present invention, the position of the rotor 10 in stationary mode is detected by the stationary position detection circuit 4 before kick at the time of starting.

Figure 3:
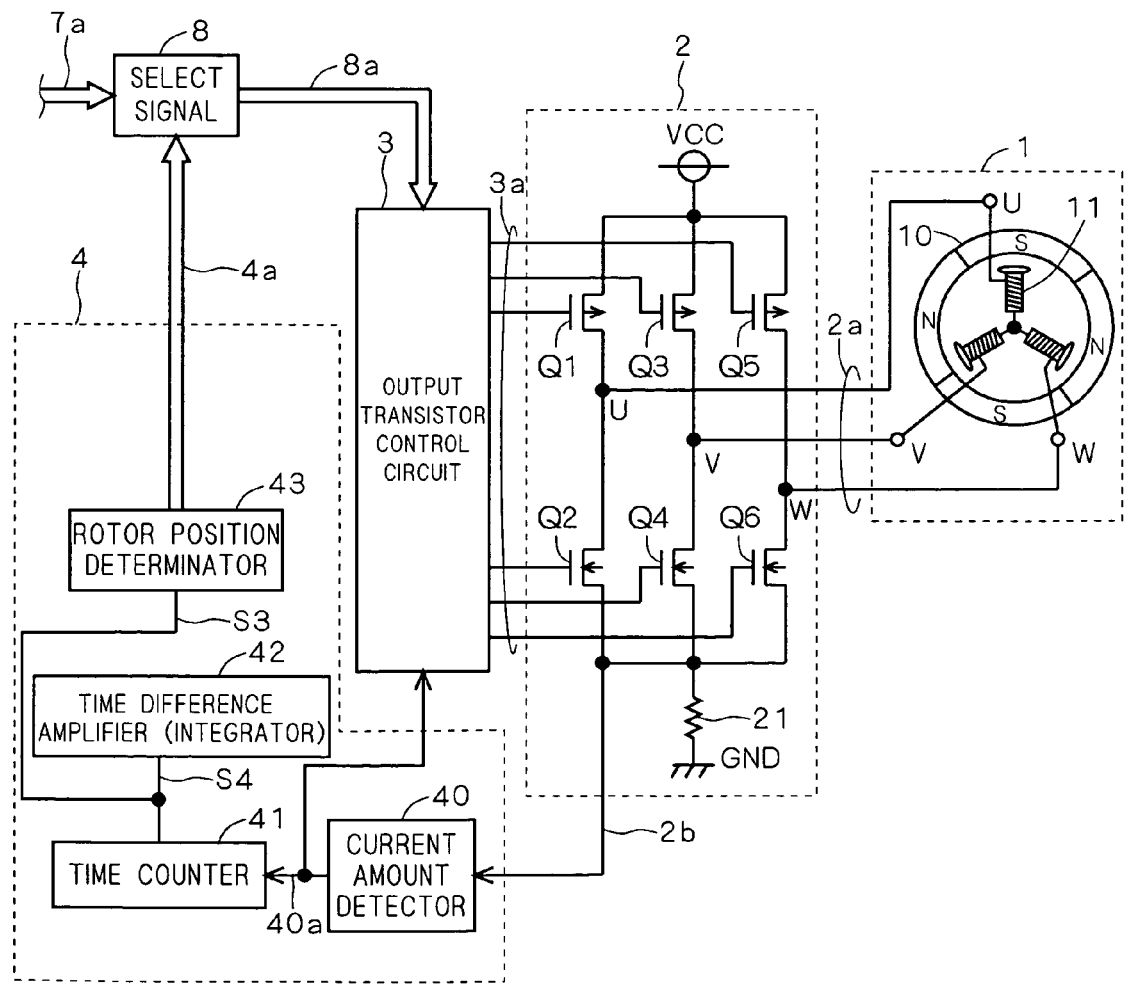
FIG. 3 is a diagram showing a detailed configuration of the stationary position detection circuit according to the first embodiment.

FIG. 3 is a diagram showing a detail configuration of the stationary position detection circuit 4 according to this embodiment. As shown in FIG. 3, the stationary position detection circuit 4 includes a current amount detector 40, a time counter 41, a time difference amplifier 42 and a rotor position determinator 43.

The current amount detector 40 receives a signal 2b of the voltage generated by a resistor 21 in the inverter circuit 2, and based on this signal, generates a detection signal 40a. Based on the detection signal 40a, the time counter 41 counts the time during which the alternating current flows in the first direction under each phase load of the stator 11 and the time during which the alternating current flows under each phase load of the stator 11 in the second direction opposite to the first direction, and outputs a signal S4 as a current signal.

Also, the time difference amplifier 42 converts the signal S4 constituting a current signal into a voltage signal S3, and outputs by amplifying the voltage signal S3 corresponding to the accumulation, by the number of alternations of the alternating current, of the time during which the alternating current flows in the first and second direction under each phase load of the stator 11. The rotor position determinator 43 determines the position of the rotor in stationary mode in accordance with the value of the voltage signal S3.

FIG. 4 is a diagram showing a detailed configuration of the current amount detector 40. The current amount detector 40 includes a power supply 400, a comparator 401, an AND gate circuit 402, a D-flip-flop 403 and a mask signal generating circuit 404. In the comparator 401, the voltage drop Vr across the resistor 21 generated by the alternating current in the inverter circuit 2 is compared with a predetermined voltage V1 generated by the power supply 400, and in the case where the voltage drop Vr is larger than the voltage V1, the output of the comparator 401 is activated.

The AND gate circuit 402 calculates the logic product of the mask signal 6b output from the mask signal generating circuit 404 and the output of the comparator 401, and outputs a signal Sr. The D-flip-flop 403 outputs the output Q as a detection signal 40a. Also, the inverted output /Q is an inverted signal of the output Q and applied to the input D of the D-flip-flop 403. The signal Sr is applied to the clock input T of the D-flip-flop 403. The mask signal generating circuit 404 generates a mask signal 6b.

FIG. 5 is a diagram showing a detailed configuration of the time counter 41, the time difference amplifier 42 and the rotor position determinator 43 in the stationary position detection circuit 4. The time counter 41 includes a current source 410, a first switch 411 for selectively outputting a current I1 from the current source 410 when the logic value of the detection signal 40a is Low, and a second switch 412 for selectively outputting the current I1 from the current source 410 when the logic value of the detection signal 40a is Hi. The output from the first switch 411 is a signal S4a constituting one part of the signal S4, and the output from the second switch 412 is a signal S4b constituting the other part of the signal S4.

The time difference amplifier 42 includes a first capacitor 423 of a predetermined capacitance charged by the output of the first switch 411 and a second capacitor 421 having the same capacitance as the first capacitor 423 and charged by the output of the second switch 412. One end of the first capacitor 423 is connected to the first switch 411, and the other end thereof is supplied with the grounding potential GND. One end of the second capacitor 421 is connected to the second switch 412, and the other end thereof applied with the grounding potential GND. The potential at one end of the first capacitor 423 constitutes a signal S3a making up one part of the voltage signal S3, and the potential at one end of the second capacitor 421 constitutes a signal S3b making up the other part of the voltage signal S3.

Also, the time difference amplifier 42 includes a transistor 422 to discharge the first capacitor 423 by applying the grounding potential GND to one end of the first capacitor 423 during the activation of a reset signal S2 and a transistor 420 to discharge the second capacitor 421 by applying the grounding potential GND to one end of the second capacitor 421 during the activation of the reset signal S2.

The rotor position determinator 43 includes a comparator 430 having the positive and negative terminals thereof supplied with the signal S3b making the other part of the voltage signal S3 and the signal S3a making up the one part of the voltage signal S3, respectively, so that the output logic value functions as a determination signal 4a for the position of the rotor in stationary mode.

Figure 6:
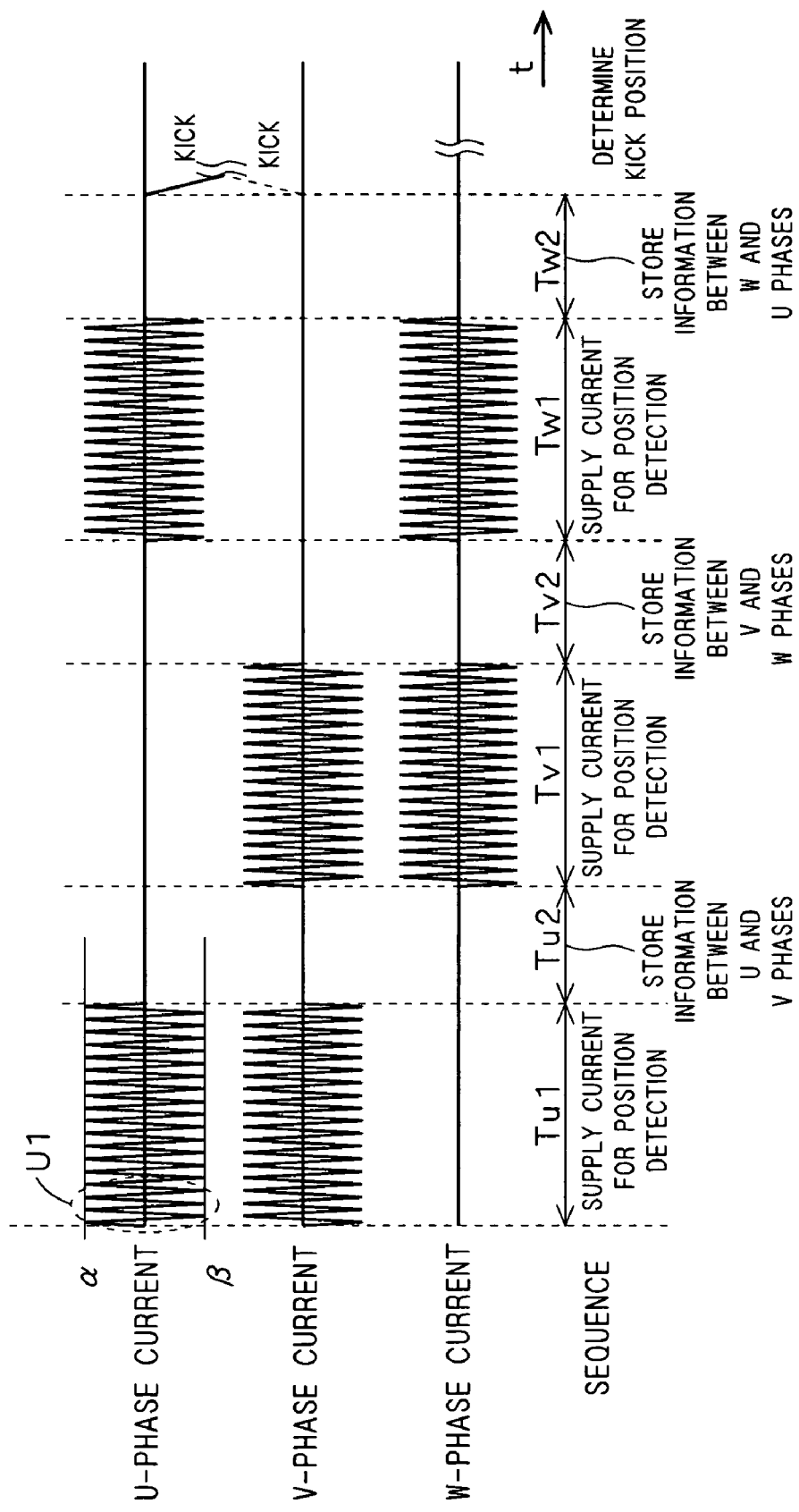
FIG. 6 is a timing chart while the stationary position detection circuit detects the stationary rotor position before kicking at the time of starting.

Next, the operation of the stationary position detection circuit 4 according to this embodiment is explained. FIG. 6 is a timing chart for the stationary position detection circuit 4 to detect the position of the rotor 10 in stationary mode before kick at the time of starting.

As shown in FIG. 6, according to the present invention, the alternating current is supplied between U and V phases, between V and W phases and between W and U phases before determining the kick position. Specifically, during the period Tu1, the alternating current is supplied between U and V phases to detect the position of the rotor 10, and during the subsequent period Tu2, the information on the detection result between U and V phases is stored in the output transistor control circuit 3. Incidentally, the U-phase current and the V-phase current have complementary waveforms due to the fact that the current applied to the U-phase load (or the V-phase load) is set as positive, and the current flowing out of the U-phase load (or the V-phase load) as negative.

In a similar fashion, the alternating current is supplied between V and W phases during the period Tv1, and during the subsequent period Tv2, the information on the detection result between V and W phases is stored in the output transistor control circuit 3. Also, the alternating current is supplied between W and U phases during the period Tw1, and the information on the detection result between W and U phases is stored in the output transistor control circuit 3 during the subsequent period Tw2.

Figure 7:
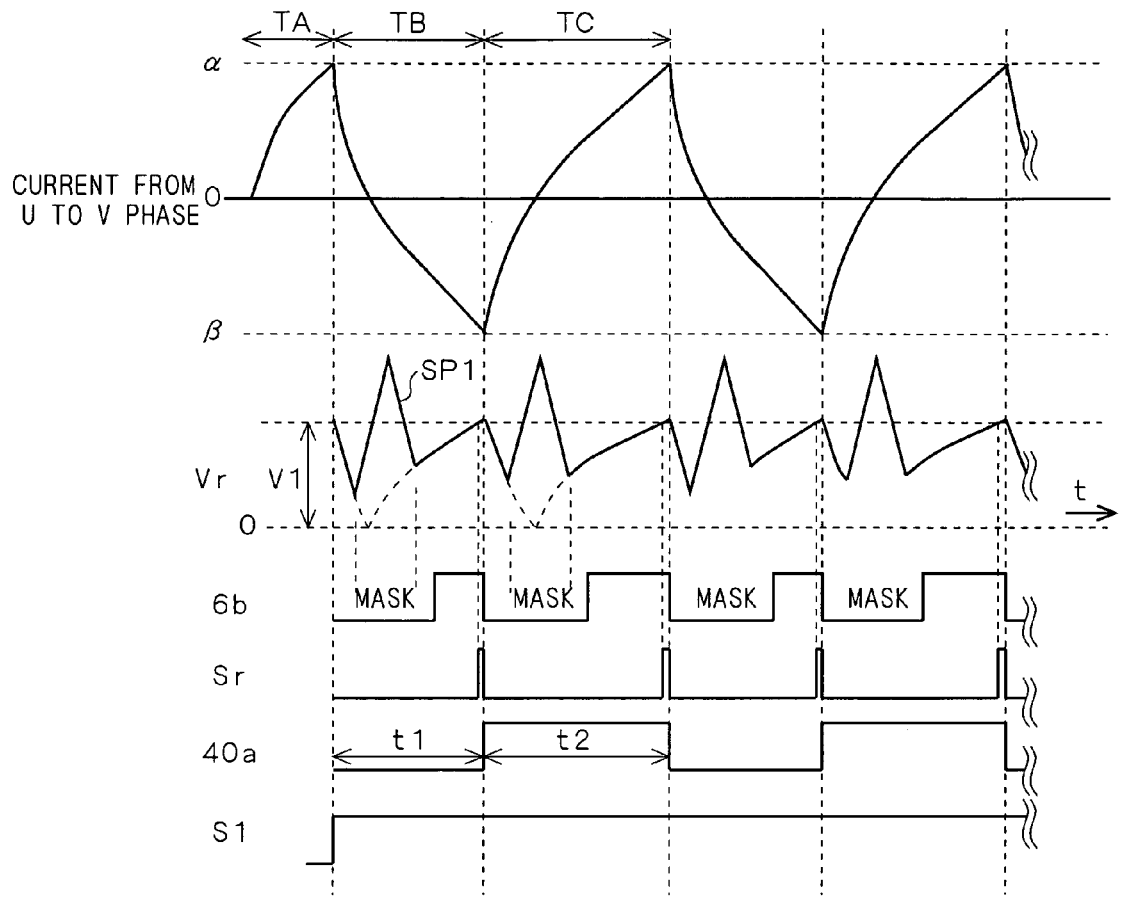
FIG. 7 is a partly enlarged timing chart for an alternating current generation period between U and V phases.

FIG. 7 is an enlarged timing chart for one part U1 of the alternating current generation period between U and V phases in FIG. 6. In the motor drive circuit according to the present invention, the time of transient response of the current flowing in each phase load of the stator 11, which is affected by the magnetic field of the rotor 10, is counted thereby to determine the magnitude of the inductance value, and based on the result thereof, the physical position of the rotor 10 is determined.

First, as indicated by the period TA in FIG. 7, the stationary position detection circuit 4, through the output transistor control circuit 3 for controlling the inverter circuit 2, generates a current flowing in the first direction from U to V phase, which current is increased to a value α (for example, an absolute value 0.1 A). Once the current flowing in the first direction from U to V phase has reached the value α, the stationary position detection circuit 4 reduces and returns the current value back to 0 A through the output transistor control circuit 3 as shown by the period TB in FIG. 7. Then, a current flowing from V to U phase in the second direction opposite to the first direction is generated, and increased to reach a value β of opposite sign to the value α (i.e., the absolute value 0.1 A like the value α, for example).

Once the current flowing in the second direction from V to U phase has reached the value β, the stationary position detection circuit 4 reduces the current value back to 0 A through the output transistor control circuit 3 as shown by the period TC in FIG. 7. Then, a current flowing in the first direction from U to V phase is generated again, and increased to reach the value α. Subsequently, the stationary position detection circuit 4, through the output transistor control circuit 3, generates the current alternating between values α and β by the number of times equal to the number of alternations of the alternating current.

Figure 8:
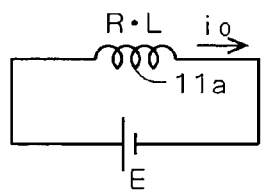
FIG. 8 is a circuit diagram for considering the transient phenomenon during the period TA with a DC voltage applied to a load having a resistance and an inductance.

A circuit equation is formulated with the load 11*a* of FIG. 2 as a model for each of the periods TA to TC. First, FIG. 8 is a circuit diagram for considering the transient phenomenon during the period TA with a DC voltage E applied to the load 11*a* having the resistance R and the inductance L. In the circuit diagram of FIG. 8, the initial value of the current flowing in the load 11*a* is set to i₀.

In this circuit diagram, the current i(t) changing with time t is given as follows.

$$i(t) = \frac{E}{R}\left\{1 - e^{-\frac{R}{L}t}\right\} + i_0 e^{-\frac{R}{L}t} \quad (1)$$

As shown in FIG. 7, no current flows in the beginning of the period TA, and therefore the second term of Equation 1 is considered 0. In other words, the current i(t) during the period TA is expressed as follows.

$$i(t) = \frac{E}{R}\left\{1 - e^{-\frac{R}{L}t}\right\} \quad (2)$$

Equation 2 is modified as follows.

$$t = -\frac{L}{R} \cdot \ln\left\{1 - \frac{\alpha}{\frac{E}{R}}\right\} \quad (3)$$

This equation represents time t.

Figure 9:
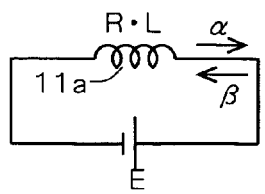
FIG. 9 is a circuit diagram for considering the transient phenomenon during the period TB.

Next, consider the transient phenomenon during the period TB. FIG. 9 is a circuit diagram for this purpose. In the beginning of the period TB, a current of initial value α flows and therefore, in FIG. 9, the current α is indicated in the same direction as i₀ of FIG. 8. At the end of the period TB, on the other hand, a current of value β inverted in sign from the value α flows, and therefore, in FIG. 9, the current β opposite in direction to the current α is also indicated. Also, a voltage opposite in direction to the voltage for the period TA is applied to the load 11*a* under the control of the inverter 2, and therefore, the direction of the DC voltage E in FIG. 9 is opposite to the direction of the DC voltage E of FIG. 8.

In this circuit diagram, an equation for the time point when the current of value β flows is considered on the basis of Equation 1 as follows.

$$\beta = \frac{E}{R}\left\{1 - e^{-\frac{R}{L}t}\right\} - \alpha e^{-\frac{R}{L}t} \quad (4)$$

Equation 4 is modified as follows.

$$e^{-\frac{R}{L}t} = \frac{\frac{E}{R} - \beta}{\frac{E}{R} + \alpha} \quad (5)$$

Equation 5 can be further modified as follows.

$$t = -\frac{L}{R} \cdot \ln\left[\frac{\frac{E}{R} - \beta}{\frac{E}{R} + \alpha}\right] \quad (6)$$

This equation represents time t. In FIG. 7, the period TB is expressed as time t1 of the detection signal 40*a*, and therefore, t1 is employed in place of time t. Also, assuming that the inductance L of the load 11*a* for the period TB is L1, Equation 6 can be expressed as follows.

$$t1 = -\frac{L1}{R} \cdot \ln\left[\frac{\frac{E}{R} - \beta}{\frac{E}{R} + \alpha}\right] \quad (7)$$

Next, consider the transient phenomenon for the period TC. In this case, as understood from FIG. 7, the only difference is that the initial value is β and the end value is α, and the other points are similar to those for the period TB. In FIG. 9 and Equation 6, therefore, the values α and β for the period TB are replaced with each other. Thus, the circuit equation for the period TC is given as follows.

$$t = -\frac{L}{R} \cdot \ln\left[\frac{\frac{E}{R} - \alpha}{\frac{E}{R} + \beta}\right] \quad (8)$$

In FIG. 7, the period TC is expressed by time t2 of the detection signal 40*a*. By employing t2 in place of time t and setting the inductance of the load 11*a* for the period TC to L2, therefore, Equation 8 can be expressed as follows.

$$t2 = -\frac{L2}{R} \cdot \ln\left[\frac{\frac{E}{R} - \alpha}{\frac{E}{R} + \beta}\right] \quad (9)$$

Comparison between Equations 7 and 9 shows that as long as α and β are equal to each other in absolute value, the ratio between time t1 and time t2 is expressed as follows.

$$t1:t2 = L1:L2 \quad (10)$$

As understood from Equation 10, the ratio between the inductances L1 and L2 coincides with the ratio between the time t1 for which the alternating current changes from α to β in value and the time t2 for which the alternating current changes from β to α in value. By counting the times t1 and t2 and specifying the relative magnitudes thereof, therefore, the relation between the U-V load 11 and the position of the rotor 10 can be defined.

Figure 10:
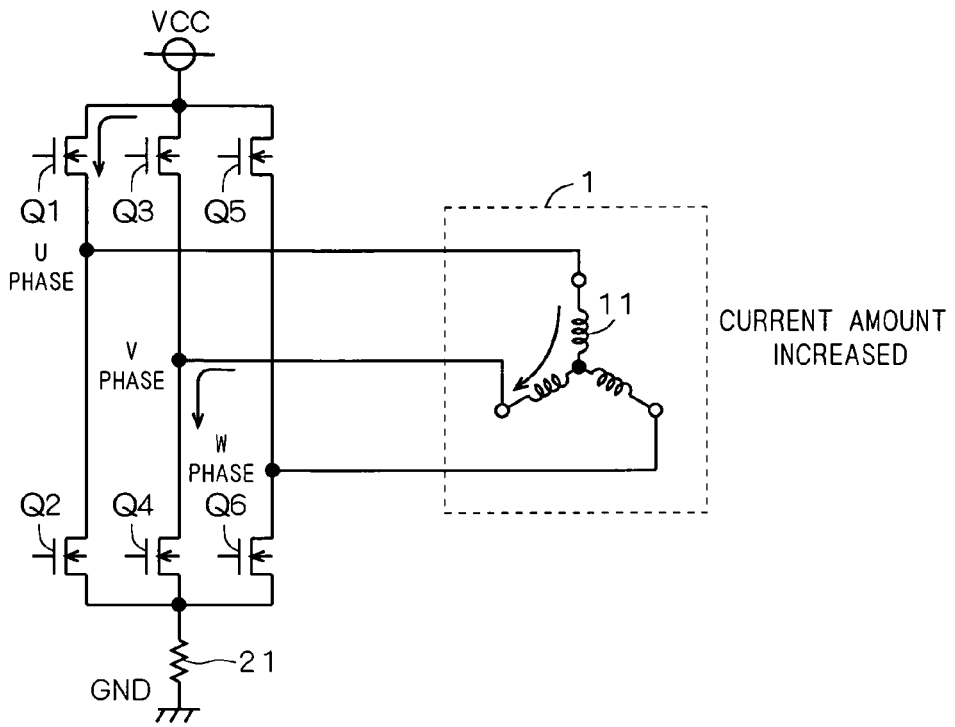
FIG. 10 is a diagram showing the operation of the inverter circuit.

Incidentally, FIGS. 10 to 13 are diagrams showing the operation of the inverter circuit 2 for the periods TA to TC. FIG. 10 shows a case in which the alternating current flows increasingly in the first direction from U phase to V phase (the portion of the periods TA and TC in FIG. 7 during which the current value is larger than 0 A). In this case, the transistors Q1, Q4 in the inverter circuit 2 turn on, while the other transistors remain off.

Figure 11:
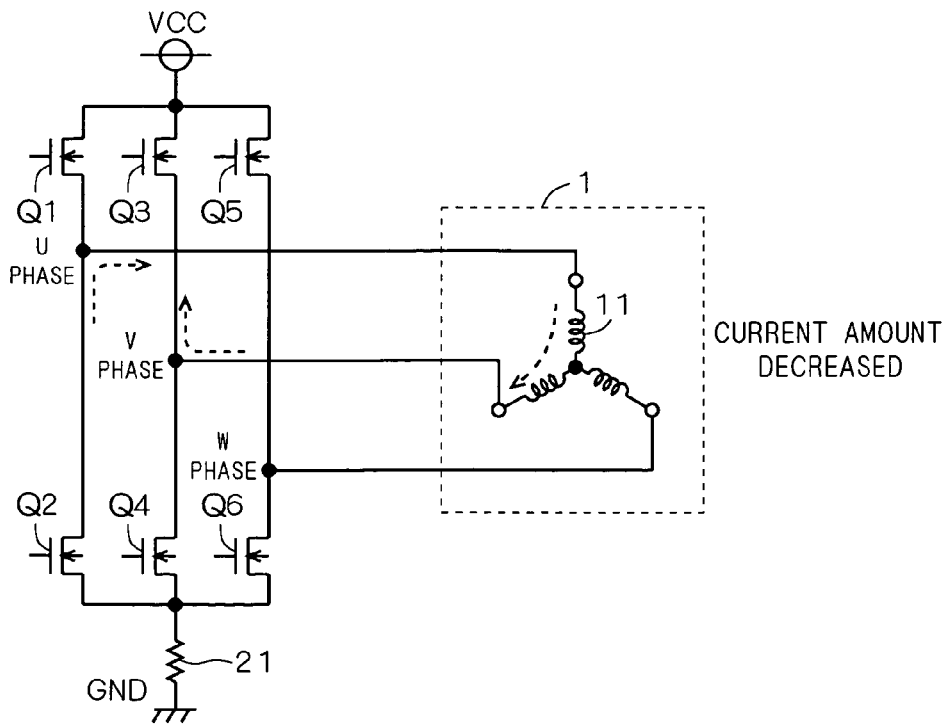
FIG. 11 is a diagram showing the operation of the inverter circuit.
Figure 12:
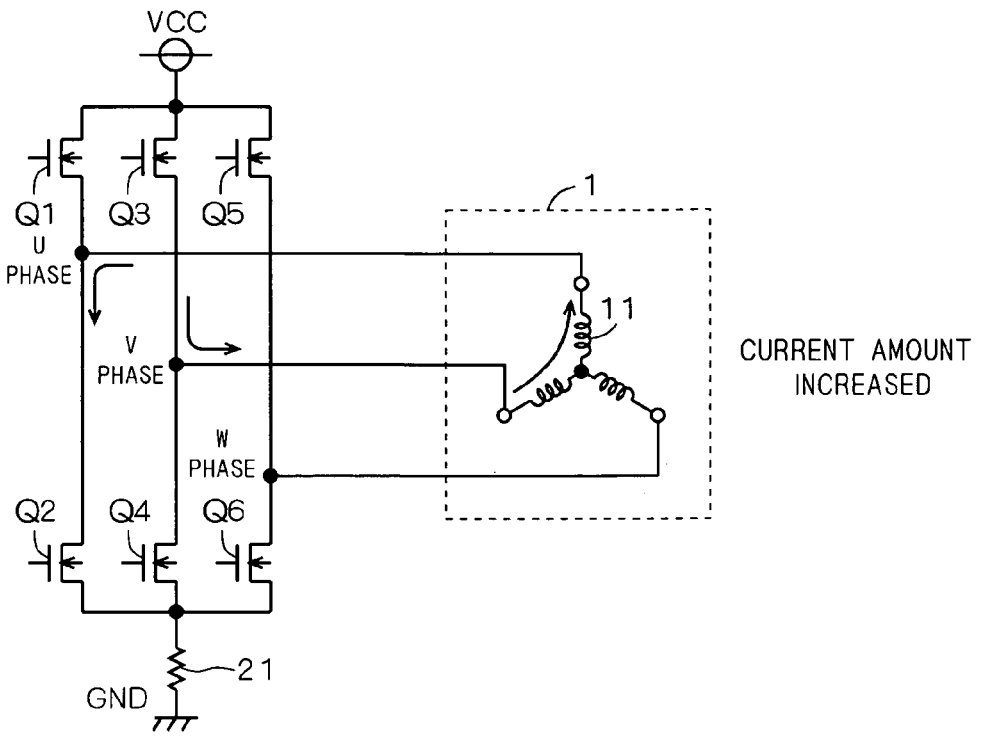
FIG. 12 is a diagram showing the operation of the inverter circuit.
Figure 13:
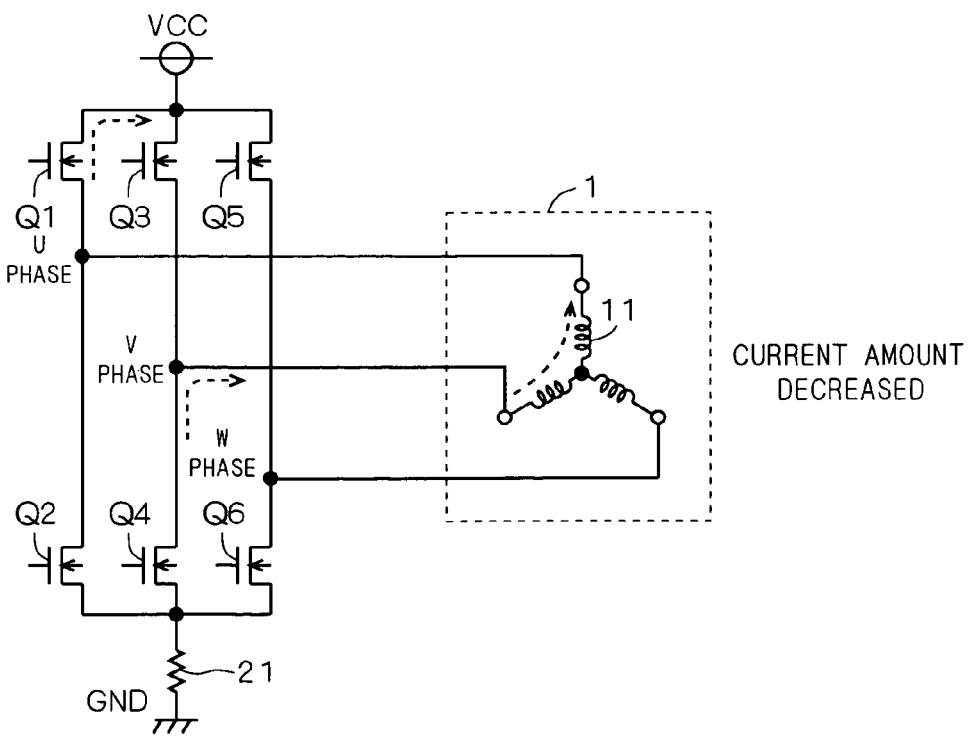
FIG. 13 is a diagram showing the operation of the inverter circuit.

FIG. 11 shows a case in which the alternating current flowing in the first direction is attenuated (the portion of the period TB in FIG. 7 during which the current value is larger than 0 A). In this case, the transistors Q2, Q3 in the inverter circuit 2 turn on, while the other transistors remain off. FIG. 12 shows a case in which the alternating current flows increasingly in the second direction from V phase to U phase (the portion of the period TB in FIG. 7 during which the current value is smaller than 0 A). In this case, the transistors Q2, Q3 in the inverter circuit 2 turn on, while the other transistors remain off. FIG. 13 shows a case in which the alternating current flowing in the second direction is attenuated (the portion of the period TC in FIG. 7 during which the current value is smaller than 0 A). In this case, the transistors Q1, Q4 in the inverter circuit 2 turn on, while the other transistors remain off.

The operation of each circuit for generating the alternating current and determining the position of the rotor 10 is explained. First, the value of the voltage V1 generated by the power supply 400 in the current amount detector 40 shown in FIG. 4 is set to a value slightly lower than the maximum value of the voltage drop Vr across the resistor 21 in the inverter circuit 2 for each period of TB, TC, etc.

The value of the voltage drop Vr across the resistor 21 is the product of the current α and the resistance value of the resistor 21 in the beginning of the period TB. With the lapse of the period TB, the current value decreases, and therefore the value of the voltage drop Vr also decreases along a waveform similar to that of the current value.

During the decrease in the current value, a spike SP1 appears in the voltage drop Vr. A current in the direction opposite to the direction from the power supply Vcc toward the grounding potential GND is flowing in the transistors Q2, Q3 (dashed arrow in FIG. 11), and a voltage of an inverse bias is applied between drain and source thereof. At about a point where the current changes from the first to the second direction (at about a point where FIG. 11 changes to FIG. 12), therefore, the charge accumulated in the drain-source capacitance flows sharply through the resistor 21 in addition to the current in the direction from the power supply Vcc toward the grounding potential GND (solid arrow in FIG. 12). It is for this reason that the voltage drop Vr develops the spike SP1.

The mask signal 6b is for masking the spike SP1 not to be detected, and output from the mask signal generating circuit 404 for a predetermined length of time (say, 2 μsec) from the time point when the current reaches the value α or β. The mask signal generating circuit 404 detects the signal 3a to detect the turn on/off time of the transistors Q1 to Q6 and outputs a mask signal 6b for a predetermined length of time from the time of turn on/off. The mask signal 6b, as shown in FIG. 7, is a Low active signal. During the mask period, the mask signal 6b is Low and therefore an AND gate circuit 402 continues to output a Low signal regardless of the output of the comparator 401.

With the attenuation of the alternating current flowing in the first direction while the alternating current increasingly flows in the second direction, the value of the voltage drop Vr across the resistor 21 approaches the value of the product of the current β and the resistance value of the resistor 21 in the last half of the period TB. As a result, the value of the voltage drop Vr also increases with a waveform similar to that of the current value.

Once the value of the voltage drop Vr increases beyond the value of the voltage V1 generated by the power supply 400, the comparator 401 activates the output thereof to Hi level. At this time point, the mask period is already ended and the mask signal 6b assumes a Hi level. Thus, the AND gate circuit 402 outputs a signal Sr as an activated output from the comparator 401. It is for this reason that the signal Sr is generated in pulses in FIG. 7.

With the start of the period TC, the AND gate circuit 402 receives the mask signal 6b activated to Low again, and outputs a Low signal without regard to the output of the comparator 401. Upon the lapse of the mask period in the period TC, the AND gate circuit 402 outputs the signal Sr from the comparator 401 activated when the value of the voltage drop Vr increases beyond the value of the voltage V1. During the subsequent periods, the AND gate circuit 402 similarly outputs a pulse-like signal Sr. In this way, the AND gate circuit 402 functions as a logic gate circuit for passing the output of the comparator 401 only in each last half of the time t1 and t2.

The D-flip-flop 403 has the inverted output /Q thereof applied to the input D thereof. With the activation of the clock input T, therefore, the output Q thereof alternates between Hi and Low states. The D-flip-flop 403, with the signal Sr applied to the clock input T, functions to invert the logic value of the output with the activation of the output of the AND gate circuit as a motive.

The inverted output of the D-flip-flop 403 constitutes a detection signal 40a for the values α and β and a control signal 40a for the alternating current. Specifically, by the control signal 40a shown in FIG. 3, the current amount detector 40, through the output transistor control circuit 3 for controlling the inverter circuit 2 for driving the motor 1, so operates that the alternating currents flowing alternately in the first direction from U to V phases and in the second direction from V to U phases are rendered to flow through the load 11a between U and V phases, and after detection that the alternating current flowing in the first direction has reached the value α, the alternating current is reduced gradually through the output transistor control circuit 3 to flow in the second direction. Also, after detection that the alternating current flowing in the second direction has reached the value β, the alternating current is gradually reduced through the output transistor control circuit 3 to flow again in the first direction. Subsequently, the detection of the values α and β and the control of the alternating current through the output transistor control circuit 3 are repeated by the number of times equal to the number of alternations.

Incidentally, the reset signal S1 shown in FIG. 4 is activated after the flow of the alternating current between U and V phases before the alternating current next begins to flow between V and W phases. In similar fashion, the reset signal S1 is activated after the flow of the alternating current between V and W phases before it next begins to flow between W and U phases, so that the result of detection between the phases may have no effect on the next detection between the phases.

The time counter 41 shown in FIGS. 3, 5, in accordance with the detection signal 40a, so functions as to count the time t1 (the period TB in FIG. 7) for which the alternating current changes from value α to β and the time t2 (the period TC in FIG. 7) for which the alternating current changes from value β to α and output the current signal S4 (S4a, S4b) for the time t1, t2 thus counted.

Specifically, the first switch 411 in the time counter 41, based on the detection signal 40a, counts the time t1 by selectively outputting the current I1 from the current source 410 during the period (the Low period of the detection signal 40a) after detection of the value α to the detection of the value β by the current amount detector 40. Similarly, the second switch 412 in the time counter 41, based on the detection signal 40a, counts the time t2 by selectively outputting the current I1 from the current source 410 during the period (the Hi period of the detection signal 40a) from the detection of the value β to the detection of the value α by the current amount detector 40.

The time difference amplifier 42 shown in FIGS. 3, 5 converts the signal S4 constituting a current signal into a voltage signal S3 and amplifies the voltage signal S3 (S3a, S3b) in accordance with the accumulation of the time t1, t2 by the number of alternations. Specifically, the first capacitor 423 accumulates the charge each time the current signal S4a is input from the first switch 411 turned on during the time t1, and increases the accumulated charge in accordance with the accumulation of time t1 by the number of alternations thereby to amplify the signal S3a. In similar manner, the second capacitor 421 accumulates the charge each time the current signal S4b is input from the second switch 412 turned on during the time t2, and increases the accumulated charge in accordance with the accumulation of time t2 by the number of alternations thereby to amplify the signal S3b.

The first capacitor 423 and the second capacitor 421 have the same capacitance value and are supplied with the same current I1. Assuming that time t1 and t2 are the same, therefore, the signals S3a and S3b take the same value. In the case where time t1 and t2 are different in value, however, the difference between time t1 and t2 is emphasized in output in view of the fact that the signals S3a, S3b are amplified by the number of alternations.

Incidentally, the reset signal S2 shown in FIG. 5 is activated after the alternating current flows between U and V phases before next beginning to flow between U and W phases, and similarly activated after the alternating current flows between V and W phases before next beginning to flow between W and U phases. This signal is for preventing the detection result between the phases (the charge amount of the first capacitor 423 and the second capacitor 421) from affecting the next detection between the phases.

The comparator 430 of the rotor position determinator 43 shown in FIG. 5 compares the magnitude of the signal S3a with that of the signal S3b and outputs a Hi logic value in the case where the signal S3b is larger than the signal S3a, and outputs a Low logic value in the case where the signal S3a is larger than the signal S3b. The output 4a of this comparator 430 functions as a determination signal for the position of the rotor 11 in stationary mode.

The foregoing is the description of the generation of the alternating current between U and V phases and the determination of the rotor position in FIG. 6. After that, the alternating current is generated between V and W phases and between W and U phases and the rotor position determined similarly.

Specifically, the current amount detector 40 detects the values α and β between V and W phases of the load 11a and controls the alternating current through the output transistor control circuit 3. The time counter 41 counts the time t1, t2 between V and W phases of the load 11a, and the time difference amplifier 42 amplifies by converting the load 11a between V and W phases into a voltage signal S3. The rotor position determinator 43, on the other hand, makes the determination of the load 11a between V and W phases in response to the voltage signal S3. After that, the current amount detector 40 detects the values α and β between W and U phases of the load 11a and controls the alternating current through the output transistor control circuit 3. The time counter 41 counts the time t1, t2 between W and U phases of the load 11a, and the time difference amplifier 42 amplifies by converting the load 11a between W and U phases to the voltage signal S3. The rotor position determinator 43 is supplied with the voltage signal S3 and makes the determination of the load 11a between W and U phases.

Figure 14:
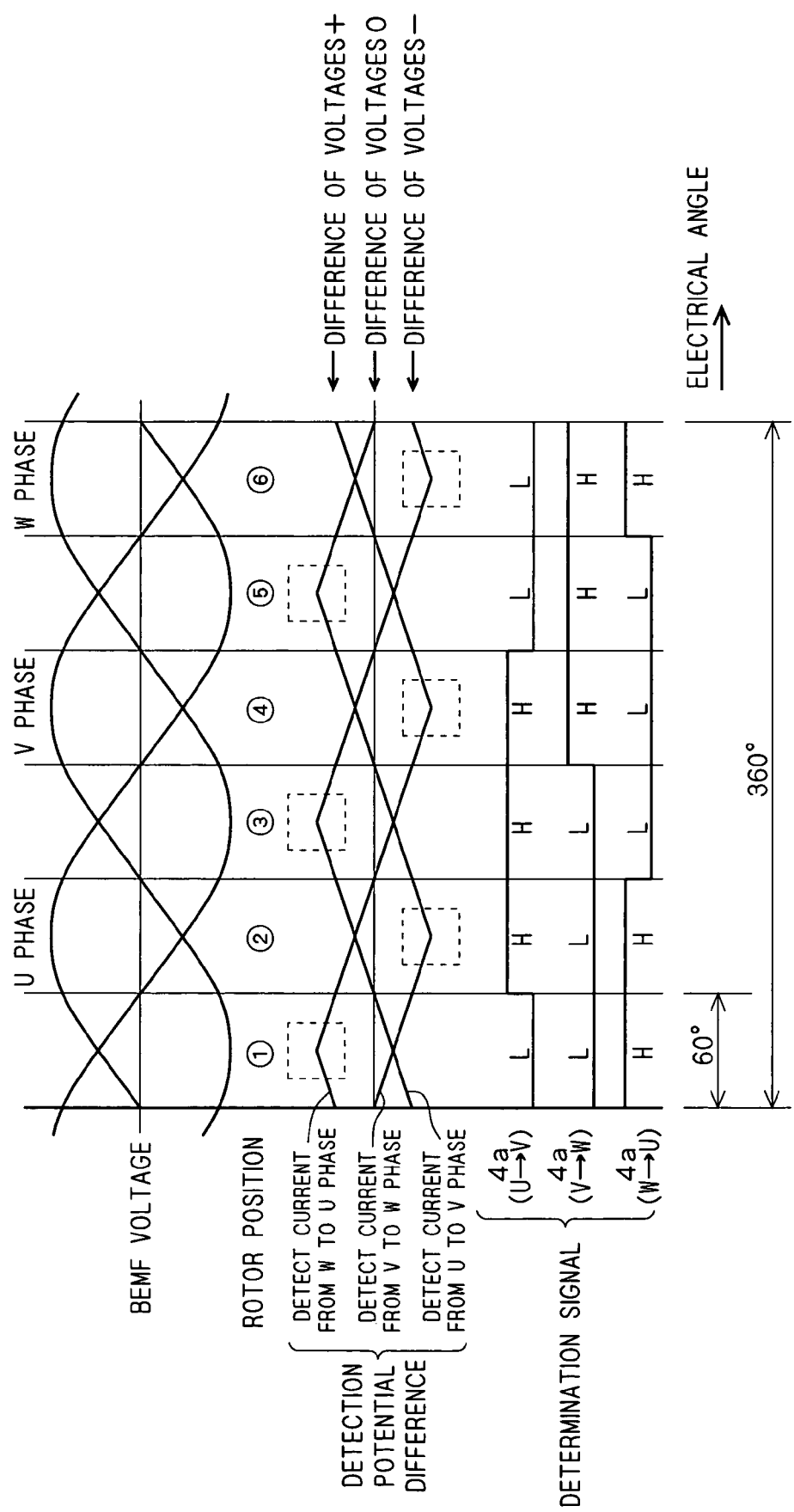
FIG. 14 is a diagram for explaining the relation of correspondence between the result of generating the alternating current between the phases and determining the rotor position on the one hand and the rotor position on the other hand.

FIGS. 14, 15 are diagrams for explaining the relation of correspondence between the result of generation of the alternating current between the phases and determination of the rotor position on the one hand and the position of the rotor 10 on the other hand. Take the alternating current between U and V phases as an example. In the case where the time t1 during which the alternating current flows in the first direction from U to V phases is longer than the time t2 during which the alternating current flows in the second direction from V to U phases, as indicated by circles 1, 5, 6 in FIG. 14, the difference of voltages of the signals S3a, S3b is negative and the output 4a of the comparator 430 is Low.

In the process, the relative positions of the rotor 10 and the stator 11 can be considered such that they are at any of the positions indicated by the circles 1, 5, 6 in FIG. 15. Especially, in the case of the circle 6 in FIG. 15, the U-phase load of the stator 11 is opposed squarely to the S pole of the rotor 10 and the V-phase load of the stator 11 is squarely opposed to the N pole of the rotor 10, and therefore the difference between the inductances L1, L2 becomes most conspicuous.

In the case where the time t1 during which the alternating current flows in the first direction from U to V phases is shorter than the time t2 during which the alternating current flows in the second direction from V to U phases, on the other hand, as indicated by circles 2, 3, 4 in FIG. 14, the difference of voltages between the signals S3a, S3b assumes a positive value, and the output 4a of the comparator 430 is Hi.

In the process, the relative positions of the rotor 10 and the stator 11 can be considered such that they are at any of the positions indicated by the circles 2, 3, 4 in FIG. 15. Especially, in the case of the circle 3 in FIG. 15, the U-phase load of the stator 11 is opposed squarely to the N pole of the rotor 10 and the V-phase load of the stator 11 is squarely opposed to the S pole of the rotor 10, and therefore the difference between the inductances L1, L2 becomes most conspicuous.

In similar fashion, between V and W phases and between W and U phases, the rotor position is determined by the output 4a of the comparator 430, and therefore, the position of the rotor 10 in stationary mode is more accurately determined based on the combination of the determination results for the respective phases of the load 11a. Specifically, as shown in FIGS. 14, 15, the rotor position is determined as circle 1 in the case where the determination result between U and V phases is Low, the determination result between V and W phases is Low and the determination result between W and U phases is Hi, as circle 2 in the case where the determination result between U and V phases is Hi, the determination result between V and W phases is Low and the determination result between W and U phases is Hi, as circle 3 in the case where the determination result between U and V phases is Hi, the determination result between V and W phases is Low and the determination result between W and U phases is Low, as circle 4 in the case where the determination result between U and V phases is Hi, the determination result between V and W phases is Hi and the determination result between W and U phases is Low, as circle 5 in the case where the determination result between U and V phases is Low, the determination result between V and W phases is Hi and the determination result between W and U phases is Low, and as circle 6 in the case where the determination result between U and V phases is Low, the determination result between V and W phases is Hi and the determination result between W and U phases is Hi.

These determination results indicate the position of the motor rotor in stationary mode and is referred to by the output transistor control circuit 3 at the time of kick operation.

In the stationary position detection circuit and the motor drive circuit according to this embodiment, the time counter 41 counts the time t1, t2, and the time difference amplifier converts the time t1, t2 to the voltage signal S3 and amplifies the voltage signal S3 in accordance with the accumulation of the time t1, t2 by the number of alternations of the alternating current. Since the alternating current is used, unlike in the case where the kickback voltage is used, the voltage signal S3 can be amplified with an increased number of alternations for a higher detection accuracy. Also, an increased number of alternations makes it possible to amplify the voltage signal S3 without increasing the values α, β of the alternating current, and therefore, unlike in the case where the kickback voltage is used, the alternating current of a large value is not required to be supplied (about 0.1 A, for example). As a result, the alternating current can be reduced to a small value, and the vibration can be suppressed. In this way, a stationary position detection circuit and a motor drive circuit capable of detecting the position of the rotor 10 more appropriately can be realized.

Also, in the stationary position detection circuit and the motor drive circuit according to this embodiment, the rotor position determinator 43 determines the rotor position based on the voltage signal S3 for each phase of the load on the one hand and determines the position of the rotor 10 in stationary mode also based on the combination of the determination results for the respective phases of the load on the other hand. In view of the fact that the position of the rotor 10 is varied with the combination of the determination results for the respective phases of the load, the position of the rotor 10 can be detected more accurately.

Further, in the stationary position detection circuit and the motor drive circuit according to this embodiment, the current amount detector 40 includes the comparator 401, the AND gate circuit 402 and the D-flip-flop 403 and operates in such a manner that the inversion of the output of the D-flip-flop 403 constitutes the detection signal 40a of the values α and β and the control signal 40a of the alternating current. Thus, the current amount detector 40 can be configured of a simplified circuit.

Furthermore, in the stationary position detection circuit and the motor drive circuit according to this embodiment, the time counter 41 includes a current source 410 and first and second switches 411, 412, the time difference amplifier 42 includes first and second capacitors 421, 423, and the rotor position determinator 43 includes a comparator 430. Thus, the time counter 41, the time difference amplifier 42 and the rotor position determinator 43 can be configured of a simple circuit.

Second Embodiment

This embodiment is a modification of the stationary position detection circuit and the motor drive circuit according to the first embodiment, and represents another example of the configuration including the time counter 41 and the time difference amplifier 42 according to the first embodiment.

FIG. 16 is a diagram showing a detailed configuration of the time counter 41a and the time difference amplifier 42a in the stationary position detection circuit 4 according to this embodiment. The time counter 41a includes first and second current sources 410, 413, a first switch 411 for selectively outputting the current I1 from the first current source 410 when the logic value of the detection signal 40a is Low, and a second switch 412 for selectively drawing the current I1 to the second current source 413 when the logic value of the detection signal 40a is Hi. The current output from the first switch 411 and the current drawn by the second switch 412 constitute a current signal S4c which is the signal S4.

The time difference amplifier 42 includes a capacitor 424 having a predetermined capacitance with the inter-electrode voltage functioning as a voltage signal S3a, which is charged by the output of the first switch 411 and discharged by the current drawn by the second switch 413, a constant voltage source 426 adapted to provide the initial value of the inter-electrode voltage of the capacitor 424 and a switch 425.

One end of the capacitor 424 is connected to the first switch 411 and the second switch 412, and the other end thereof applied with the grounding potential GND. The positive terminal of the constant voltage source 426 is connected to one end of the capacitor 424 through the switch 425, and the negative terminal thereof applied with the grounding potential GND. The potential S4d at the positive terminal of the constant voltage source 426 represents the signal S3b making up the other part of the voltage signal S3.

The rotor position determinator 43 includes a comparator 430 having negative and positive terminals supplied with the signal S3a constituting one part of the voltage signal S3 and the signal S3b constituting the other part of the voltage signal S3, respectively, in which the output logic value functions as a determination signal 4a for the rotor position in stationary mode.

The time counter 41a shown in FIG. 16 has the function of counting, in accordance with the detection signal 40a, the time t1 (the period TB in FIG. 7) for which the alternating current changes from α to β and the time t2 (the period TC in FIG. 7) for which the alternating current changes from β to α, outputting the current signal S4c for the counted time t1, and drawing the current signal S4c for the counted time t2.

Specifically, the first switch 411 in the time counter 41a, in accordance with the detection signal 40a, selectively outputs the current I1 from the first current source 410 during the period (the Low period of the detection signal 40a) from the detection of the value α to the detection of the value β by the current amount detector 40 thereby to count the time t1. On the other hand, the second switch 412 in the time counter 41a, in accordance with the detection signal 40a, selectively draws the current I1 into the second current source 413 during the period (the Hi period of the detection signal 40a) from the detection of the value β to the detection of the value α by the current amount detector 40 thereby to count the time t2.

The time difference amplifier 42a shown in FIG. 16 converts the signal S4c constituting the current signal to the voltage signal S3a, and amplifies the voltage signal S3a in accordance with the accumulation of the time t1, t2 by the number of alternations. Specifically, the capacitor 424 is applied with an initial value as a voltage generated by the constant voltage source 426 by temporarily turning on the switch 425 through the reset signal S2, after which the switch 425 is turned off.

The capacitor 424 accumulates the charge each time the current signal S4c is input from the first switch 411 turned on during the time t1, and increases the accumulated charge in accordance with the accumulation of the time t1 by the number of alternations thereby to amplify the signal S3a. The capacitor 424, on the other hand, releases the charge each time the current signal S4c is drawn by the second switch 412 turned on during the time t2, and decreases the accumulated charge in accordance with the accumulation of the time t2 by the number of alternations thereby to reduce the signal S3a.

Both the current value from the first switch 411 and the current value drawn by the second switch 413 are I1. As long as the time t1 and t2 have the same value, therefore, the influent current amount and the outgoing current amount have the same value. Thus, the signal S3a constituting inter-electrode voltage of the capacitor 424 remains the same as the voltage (signal S3b) generated as an initial value by the constant voltage source 426. In the case where the time t1 and t2 have different values, however, the signal S3a, which is amplified by the number of times equal to the number of alternations, is output by emphasizing the difference between time t1 and t2, and therefore considerably different from the signal S3b assuming the initial value.

Incidentally, the reset signal S2 shown in FIG. 16, after the alternating current flows between U and V phases, is activated before the alternating current next begins to flow between V and W phases, and similarly activated before the alternating current begins to flow between W and U phases after flowing between V and W phases. The reset signal S2 thus prevents the detection result (the charge amount of the capacitor 424) between the respective phases from affecting the next detection between the phases.

The comparator 430 of the rotor position determinator 43 shown in FIG. 16 compares the magnitude of the signals S3a and S3b, and outputs a Hi logic value in the case where the signal S3b is larger than the signal S3a, and a Low logic value in the case where the signal S3a is larger than the signal S3b. The output 4a of this comparator 430 functions as a determination signal for the position of the rotor 11 in stationary mode.

The operation of the time counter 41a, the time difference amplifier 42a and the rotor position determinator 43 shown in FIG. 16 is explained above. The operation of the other circuits is similar to that of the stationary position detection circuit and the motor drive circuit according to the first embodiment and not explained.

In the stationary position detection circuit and the motor drive circuit according to this embodiment, the time counter 41a includes the first and second current sources 410, 413 and first and second switches 411, 412, the time difference amplifier 42a includes the capacitor 424 and the constant voltage source 426, and the rotor position determinator 43 includes the comparator 430. Thus, the time counter 41a, the time difference amplifier 42a and the rotor position determinator 43 can be configured as a simple circuit. Also, the capacitor 424 is the only capacitor included in the time difference amplifier 42a, and therefore the increase in circuit size can be suppressed.

Third Embodiment

This embodiment is also a modification of the stationary position detection circuit and the motor drive circuit according to the first embodiment, and represents another example of the configuration of the time counter 41 and the time difference amplifier 42 according to the first embodiment.

FIG. 17 is a diagram showing a detailed configuration of a time counter 41b and a time difference amplifier 42b in the stationary position detection circuit 4 according to this embodiment. The time counter 41b includes a current source 410, a first switch 411 for selectively outputting the current I1 from the current source 410 when the logic value of the detection signal 40a is Low, a second switch 414 for applying a predetermined potential when the logic value of the detection signal 40a is Low, a third switch 415 for selectively outputting the current I1 from the current source 410 when the logic value of the detection signal 40a is Hi, a fourth switch 412 grounded when the logic value of the detection signal 40a is Hi, and a voltage source 416 for generating a predetermined potential. The current output from the first switch 411 and the current drawn by the fourth switch 412 constitute a current signal S4f as a signal S4.

The time difference amplifier 42 includes a capacitor 427 of a predetermined capacitance value having a first electrode connected to the first switch 411 and the fourth switch 412 and a second electrode connected to the second switch 414 and the third switch 415, in which the voltage between the first and second electrodes functions as a voltage signal S3 (S3a, S3b).

The rotor position determinator 43 includes a comparator 430 and is so configured that the second electrode of the capacitor 427 is connected to the positive input terminal of the comparator 430 and the first electrode of the capacitor 427 is connected to the negative input terminal of the comparator 430. The potential at the first electrode of the capacitor 427 constitutes the signal S3a, and the potential at the second electrode of the capacitor 427 constitutes the signal S3b.

The time counter 41b shown in FIG. 17, in accordance with the detection signal 40a, counts the time t1 (the period TB in FIG. 7) for which the alternating current changes from α to β and the time t2 (the period TC in FIG. 7) for which the alternating current changes from β to α, outputs the current signal S4f for the counted time t1, and draws the current signal S4f for the counted time t2.

Specifically, the first switch 411 and the second switch 414 in the time counter 41b, in accordance with the detection signal 40a, selectively output the current I1 constituting the current signal S4f from the current source 410 during the period (the Low period of the detection signal 40a) from the detection of the value α to the detection of the value β by the current amount detector 40 thereby to count the time t1. On the other hand, the fourth switch 412 and the third switch 415 in the time counter 41b, in accordance with the detection signal 40a, selectively draw the current I1 to the grounding potential GND through the fourth switch 412 as the current signal S4f during the period (the Hi period of the detection signal 40a) from the detection of the value β to the detection of the value α by the current amount detector 40 thereby to count the time t2.

The time difference amplifier 42b shown in FIG. 17 converts the signal S4f constituting a current signal into voltage signals S3a, S3b and amplifies the voltage signals S3a, S3b in accordance with the accumulation of the time t1, t2 by the number of alternations. Specifically, the capacitor 427 accumulates the charge each time the current signal S4f is input by the turning on of the first switch 411 and the second switch 414 during the time t1, and increases the accumulated charge in accordance with the accumulation of time t1 by the number of alternations thereby to amplify the signal S3a. The capacitor 427 releases the charge, on the other hand, each time the current signal S4f is drawn by the turning on of the fourth switch 412 and the third switch 415 during the time t2, and decreases the accumulated charge in accordance with the accumulation of time t2 by the number of alternations thereby to reduce the signal S3a.

The current value from the first switch 411 is I1, and the current value drawn by the fourth switch 412 is also I1. Assuming that the time t1 and t2 have the same value, therefore, the influent current amount and the outgoing current amount have the same value. Thus, the signals S3a, S3b constituting inter-electrode voltages of the capacitor 427 develop no potential difference. In the case where the time t1 and t2 have different values, however, the signals S3a, S3b, which are amplified by the number of alternations, are output by emphasizing the difference between time t1 and t2, and the signals S3a, S3b develop a difference in magnitude in accordance with the difference between time t1 and t2.

In order to reset the circuit of FIG. 17 after detection between the respective phases, the first switch 411, the second switch 414, the third switch 415 and the fourth switch 412 are all turned on. As a result, the charge accumulated in the capacitor 427 is released.

The comparator 430 of the rotor position determinator 43 shown in FIG. 17 compares the signals S3a and S3b in magnitude, and in the case where the signal S3b is larger than the signal S3a, outputs a Hi logic value, while in the case where the signal S3a is larger than the signal S3b, a Low logic value is output. The output 4a of this comparator 430 functions as a determination signal for the position of the rotor 11 in stationary mode.

The foregoing is the description of the operation of the time counter 41b, the time difference amplifier 42b and the rotor position determinator 43 shown in FIG. 17. The operation of the other circuits is similar to that of the stationary position detection circuit and the motor drive circuit according to the first embodiment, and therefore is not described again.

In the stationary position detection circuit and the motor drive circuit according to this embodiment, the time counter 41b includes a current source 410 and first to fourth switches 411, 414, 415, 412, the time difference amplifier 41b includes a capacitor 427, and the rotor position determinator 43 includes a comparator 430. As a result, the time counter 41b, the time difference amplifier 42b and the rotor position determinator 43 can be configured as a simple circuit. Also, the capacitor 427 is the only capacitor included in the time difference amplifier 42b, and therefore the circuit size increase is suppressed.

While the invention has been shown and described in detail, the foregoing description is in all aspects illustrative and not restrictive. It is therefore understood that numerous modifications and variations can be devised without departing from the scope of the invention.

What is claimed is:

1. A stationary position detection circuit for a motor including a rotor and at least one-phase load, for detecting the position of said rotor in stationary mode, the stationary position detection circuit comprising:
   a current amount detector;
   a time counter;
   a time difference amplifier; and
   a position determinator, wherein
   said current amount detector operates in such a manner that an alternating current flowing alternately in a first direction and a second direction opposite to said first direction is rendered to flow through said load by a control circuit for controlling an inverter circuit for driving said motor, the fact that said alternating current flowing in said first direction has reached a value α is detected, after which said alternating current is rendered to flow in said second direction by gradually decreasing amount of said alternating current through said control circuit, and the fact that said alternating current flowing in said second direction has reached a value β equal to and opposite in sign to said value α is detected, after which said alternating current is rendered to flow in said first direction again by gradually decreasing amount of said alternating current through said control circuit, the detection of said values α and β and the control of said alternating current by said control circuit being subsequently repeated a predetermined number of times,
   said time counter counts the first time for which said alternating current changes from α to β and the second time for which said alternating current changes from β to α,
   said time difference amplifier converts said counted first time and second time into electrical signals and amplifies said electrical signals in accordance with the accumulation of said first time and second time by said predetermined number of times, and
   said position determinator determines the position of said rotor in stationary mode in accordance with the value of said electrical signals.

2. The stationary position detection circuit according to claim 1, wherein
   said motor is a multi-phase motor and includes said load for each phase,
   said current amount detector detects said values α and β and controls said alternating current through said control circuit, for each phase of said load,
   said time counter counts said first time and said second time for each phase of said load,
   said time difference amplifier makes the conversion into said electrical signals and amplifies said electrical signals, for each phase of said load, and
   said position determinator makes the determination for each phase of said load based on said electrical signals, and determines the position of said rotor in stationary mode also based on the combination of the determination results for each phase of said load.

3. The stationary position detection circuit according to claim 1, wherein
   said current amount detector includes:
   a comparator for comparing the voltage drop generated in said inverter circuit by said alternating current with a predetermined voltage, and in the case where said voltage drop is larger than said predetermined voltage, activating the output thereof;

a logic gate circuit for passing the output of said comparator only for each last half of said first time and said second time; and
a flip-flop for inverting the logic value output with the activation of the output from said logic gate circuit as a motive, and
the output inversion of said flip-flop constitutes a detection signal for said values $\alpha$ and $\beta$ and a control signal for said alternating current.

4. The stationary position detection circuit according to claim 1, wherein
said time counter includes:
a current source;
a first switch for selectively outputting the current from said current source for the period from the detection of said value $\alpha$ to the detection of said value $\beta$ by said current amount detector thereby to count said first time; and
a second switch for selectively outputting the current from said current source for the period from the detection of said value $\beta$ to the detection of said value $\alpha$ by said current amount detector thereby to count said second time,
said time difference amplifier includes:
a first capacitor of a predetermined capacitance value, charged by the output of said first switch and having the inter-electrode voltage functioning as one part of said electrical signals; and
a second capacitor of said predetermined capacitance value, charged by the output of said second switch and having the other inter-electrode voltage functioning as the other part of said electrical signals, and
said position determinator includes:
a comparator having positive and negative input terminals supplied with said other part and said one part, respectively, of said electrical signals, and causing the output logic value to function as a determination signal for the position of said rotor in stationary mode.

5. The stationary position detection circuit according to claim 1, wherein
said time counter includes:
first and second current sources;
a first switch for selectively outputting the current from said first current source for the period from the detection of said value $\alpha$ to the detection of said value $\beta$ by said current amount detector thereby to count said first time; and
a second switch for selectively drawing the current into said second current source for the period from the detection of said value $\beta$ to the detection of said value $\alpha$ by said current amount detector thereby to count said second time,
said time difference amplifier includes:
a capacitor of a predetermined capacitance value, charged by the output of said first switch and discharged by the current drawn by the second switch, said capacitor having the inter-electrode voltage functioning as said electrical signals; and
a constant voltage source capable of providing the initial value of said inter-electrode voltage of said capacitor, and
said position determinator includes:
a comparator having positive and the negative input terminals supplied with the constant voltage generated by said constant voltage source and said electrical signals, respectively, and causing the output logic value to function as a determination signal for the position of said rotor in stationary mode.

6. The stationary position detection circuit according to claim 1, wherein
said time counter includes:
a current source;
a first switch for selectively outputting the current from said current source for the period from the detection of said value $\alpha$ to the detection of said value $\beta$ by said current amount detector thereby to count said first time;
a second switch for providing a predetermined potential for the period from the detection of said value $\alpha$ to the detection of said value $\beta$ by said current amount detector;
a third switch for selectively outputting the current from said first current source for the period from the detection of said value $\beta$ to the detection of said value $\alpha$ by said current amount detector thereby to count said second time; and
a fourth switch grounded for the period from the detection of said value $\beta$ to the detection of said value $\alpha$ by said current amount detector,
said time difference amplifier includes:
a capacitor of a predetermined capacitance value, having a first electrode connected to said first and fourth switches and a second electrode connected to said second and third switches, the voltage between said first and second electrodes functioning as said electrical signals, and
said position determinator includes:
a comparator having positive and negative input terminals connected to said second electrode and said first electrode, respectively, of said capacitor, and having the output logic value functioning as a determination signal for the position of said rotor in stationary mode.

7. A motor drive circuit comprising:
the stationary position detection circuit according to claim 1;
said inverter circuit; and
said control circuit.

* * * * *